United States Patent

Deguchi et al.

[11] Patent Number: 5,858,433
[45] Date of Patent: Jan. 12, 1999

[54] PROCESS FOR PRODUCING PRESERVABLE SQUEEZED VEGETABLE JUICE

[75] Inventors: Naotoshi Deguchi; Toshiyuki Arai; Yasuyuki Suzuki, all of Tokyo, Japan

[73] Assignee: Kabushiki Kaisha Yakult Honsha, Tokyo, Japan

[21] Appl. No.: 776,841
[22] PCT Filed: Jun. 13, 1996
[86] PCT No.: PCT/JP96/01615
   § 371 Date: Mar. 26, 1997
   § 102(e) Date: Mar. 26, 1997
[87] PCT Pub. No.: WO97/00024
   PCT Pub. Date: Jan. 3, 1997

[30] Foreign Application Priority Data

Jun. 16, 1995 [JP] Japan ................. 7-173004

[51] Int. Cl.$^6$ ................. A23L 2/78; A23L 1/27
[52] U.S. Cl. ................. 426/271; 426/254; 426/330.5; 426/478; 426/599; 426/59
[58] Field of Search ................. 426/271, 599, 426/254, 330.5, 59, 478

[56] References Cited

U.S. PATENT DOCUMENTS 4,965,083 10/1990 Norman et al. ................. 426/271
4,975,293 12/1990 Hicks et al. ................. 426/271

FOREIGN PATENT DOCUMENTS 58-56663 9/1981 Japan .

Primary Examiner—Helen Pratt
Attorney, Agent, or Firm—Oblon, Spivak, McClelland, Maier & Neustadt, P.C.

[57] ABSTRACT

A process for preparing storable vegetable juice comprising crushing vegetables to extract juice, adding an organic acid to the vegetable juice, and treating this vegetable juice with a weakly basic anion exchange resin on which an organic acid has previously been adsorbed and a food containing a vegetable juice prepared by the process. The process can produce vegetable juice which can be stored at room temperature, produces no bad odor when stored at room temperature, and is free from a resin odor which has been unavoidable when a weakly basic anion exchange resin was used.

7 Claims, No Drawings

PROCESS FOR PRODUCING PRESERVABLE SQUEEZED VEGETABLE JUICE

FIELD OF TECHNOLOGY

The present invention relates to a process for preparing storable vegetable juice and, more particularly, to a process for preparing storable vegetable juice which not only produces almost no odor when stored at room temperature, but also is free from a resin odor originating from a weakly basic anion exchange resin.

BACKGROUND ART

Along with increased health consciousness among consumers in recent years, the desire for vegetable drinks which can be easily consumed is growing.

However, presently available vegetable drinks are a mixed tomato juice made from about 90% tomato and about 10% other vegetables, a mixed juice made from vegetables which are comparatively odorless, such as carrot and spinach, and a major portion of fruit juice, and the like. With the exception of tomato juice and carrot juice, there are no vegetable juices which are true vegetable juices commercially available at the present time.

When a juice extracted from some vegetables belonging to the Brassica family, such as cabbage, broccoli, Brussels sprouts, cauliflower, and kohlrabi, which are reported to exhibit the capability of preventing cancerous growth, or other vegetables, such as radish, onion, or egg plant, is provided as a drink, as is, or mixed with a fruit juice, this juice produces a distinct odor when stored at room temperature. Such a juice cannot be used as a raw material for manufacturing canned juice or products aseptically filled in paper receptacles to be distributed at room temperatures.

The inventors of the present invention have previously found that a vegetable juice at close to a neutral pH with no objectionable vegetable or other unusual odor can be produced by adding an edible acid such as an organic acid to vegetable juice and treating this juice with an weakly basic anion exchange resin by a batch method or circulating the juice through a column packed with a weakly basic anion exchange resin. The inventors found that the resulting juice is suitable as a raw material for producing drinks which can be stored at high temperatures. The inventors then filed a patent application (Japanese Patent Application Laid-open No. 79351/1995).

However, because the weakly basic anion exchange resin used in this method contains amine as an active group, the treatment of vegetable juice with this resin easily causes imperfect binding sites of the amine to be exposed and to shift into the recovered fluid, leaving an unpleasant odor which is called an objectionable resin odor.

Although it is possible to kill this unpleasant odor to "a degree that this resin odor is not specifically noticed" by diluting the treated vegetable juice to produce a drink with a vegetable juice concentration of about 10–20%, by mixing the vegetable juice with a fruit juice, or by adding a perfume possessing an aroma which exceeds this objectionable resin odor, incorporation of an amine compound in food is not desirable from the viewpoint of food hygiene. Improvements in this method are therefore desired.

Accordingly, the development of a process for preparing vegetable juice without an amine odor due to a weakly basic anion exchange resin while utilizing the superior odor removal action of this resin has been desired. An object of the present invention is to provide a vegetable juice overcoming the problems in conventional vegetable juices.

DISCLOSURE OF THE INVENTION

The inventors of the present invention have conducted extensive studies on the method for preventing the amine odor caused by the weakly basic anion exchange resin in the processing of vegetable juice. As a result, the inventors found that the amine odor can be effectively prevented if a weakly basic anion exchange resin is treated with an organic acid prior to processing the vegetable juice. This finding has led to the completion of the present invention.

Accordingly, the present invention relates to a process for preparing storable vegetable juice comprising crushing the vegetables to extract the juice, adding an organic acid to the vegetable juice, and treating this vegetable juice with a weakly basic anion exchange resin on which an organic acid has previously been adsorbed.

BEST MODE FOR CARRYING OUT THE INVENTION

The weakly basic anion exchange resin on which an organic acid has previously been adsorbed used in the present invention (hereinafter referred to as "organic acid-adsorbing resin") can be prepared, for example, by passing a solution of an organic acid, such as citric acid, malic acid, tartaric acid, lactic acid, or L-ascorbic acid, through a weakly basic anion exchange resin, e.g. a porous weakly basic anion exchange resin used for demineralization or deoxidation, thereby causing the organic acid to be adsorbed on the weakly basic anion exchange resin, then washing the resin with water.

Diaion™ WA20, WA21, WA30, Amberlite™ IRA-93ZU, and the like are given as examples of the weakly basic anion exchange resin on which the organic acid is adsorbed. Preferred weakly basic anion exchange resins from the viewpoint of resistance to acids used for regeneration of the resin are Amberlite™ IRA94S and Amberlite™ IRA-94S-HG (manufactured by Japan Organo Co., Ltd.).

The amount of the organic acid to be adsorbed on this weakly basic anion exchange resin is preferably in the range of about 2 to 3 equivalents of the amount of resin.

Specifically, a solution of the organic acid with a concentration of 2 to 3 equivalents g/1000 ml is fed through 1 BV (Bed Volume: the volume of resin) of resin. It is possible to feed a more dilute solution in the amount of 1 BV times the magnification dilution, but the addition of an excess amount of organic acid is undesirable because this may delay the subsequent step for washing with water.

Washing the organic acid-adsorbing resin with water is carried out to sufficiently remove the effluent water containing a high concentration of a substance with a very unpleasant resin odor. This unpleasant resin odor is thought to be produced by desorption of an incomplete binding substance of an amine-type active group from the weakly basic anion exchange resin together with the organic acid, partly due to swelling of resin on the acidic side.

Because the organic acid existing in the weakly basic anion exchange resin cannot easily be excluded due to its inherent properties, this unpleasant odor must be removed by washing with a large amount of water. The amount of water used for washing should be 10 times, preferably 14 times, and more preferably 16 times, the amount of the resin. Whether the washing is sufficient or not can be confirmed by checking the odor of the effluent water or by measuring the acidity of the organic acid or the pH of the effluent water.

When the acidity is used to confirm the completeness of washing, the acidity of the adsorbed organic acid in the effluent water is measured. Washing is deemed to be complete when the acidity is 0.2% or less, preferably 0.1% or less. Acidity as used here is defined as the weight percent of the organic acid contained in 100 g of the sample (the effluent water). When pH is used as the measure for checking completeness of washing, washing is deemed to be complete when the pH is 2.6 or more, and preferably 2.8 or more.

As the water used for washing, common drinking water such as well water, city water, and the like can be used. When the hardness of the water is high, the water is desirably softened by removing calcium and the like. Although demineralized water is ideal for washing, it is desirable in view of economy to first wash with a large amount of common water and then with demineralized water in the amount of about 2BV.

Since imperfectly combined active groups in the resin may be exposed over time after the treatment, the adsorption of organic acid on the weakly basic anion exchange resin and the washing are preferably carried out the same day or the day previous to vegetable juice processing.

Next, the method for treating vegetable juice with the organic acid-adsorbing resin which was obtained by the above process will be explained.

The vegetable juice used in the present invention may be obtained by branching, crushing, and extraction of vegetables by a conventional method or obtained by a low temperature extraction of vegetables. It is desirable that the juice be prepared by crushing and extraction at a low temperature in the presence of ascorbic acid, followed by heating to deactivate biological enzymes. Juice with excellent taste and flavor can be obtained by preparing the vegetable juice in this manner. The concentration of the ascorbic acid added to the vegetable when juice is extracted is preferably in the range of 60 to 200 mg %.

An organic acid such as citric acid, malic acid, tartaric acid, lactic acid, or L-ascorbic acid is then added to the vegetable juice thus prepared.

A fresh vegetable juice immediately after extraction is almost neutral with a pH in the neighborhood of 6.0. It is desirable to add the organic acid in an amount sufficient to change the pH of the vegetable juice to about 3.0 to 4.5, preferably about 3.5 to 4.0. A pH of 4.5 or more is undesirable because the vegetable juice deteriorates easily. If the pH is less than 3.0, on the other hand, not only is it difficult to handle the juice as food, but also the juice may produce an additional resin odor, particularly when the pH of the vegetable juice is lower than the resin pH. The resin pH here means the pH of the effluent water.

The vegetable juice to which the organic acid has been added as mentioned above is then subjected to treatment with the organic acid-adsorbing resin which had been prepared according to the method previously described.

This treatment with the resin may be carried out either by a so-called batch method or a semi-continuous method which may be partly a batch method comprising causing a meshed basket with the resin placed therein to move up and down in a tank filled with the juice. These methods may be applied to the manufacture of a small amount of vegetable juice. A continuous process using a column ion exchange method is more advantageous when regeneration of the resin and continuous, energy saving, mass production is taken into account.

The treatment of vegetable juice with the organic acid-adsorbing resin will now be described more specifically with respect to the continuous process using the column ion exchange method as an example.

First of all, a prescribed amount of the organic acid-absorbing resin prepared by the above-described method is filled into a column. For example, 10 to 100 parts of the extracted vegetable juice. As required, it is possible to use an organic acid-absorbing resin prepared in the column according to the above-described method, that is, by filling a prescribed amount of weakly basic anion exchange resin into a column, causing this resin to adsorb an organic acid, and washing the resin.

Although the amount of the resin filled into the column varies according to the concentration of the vegetable juice to be processed, about 10–30 parts by volume, preferably about 15–25 parts by volume, of the resin for 100 parts by volume of the vegetable juice may be used, when a straight vegetable juice (e.g. in the case of cabbage juice, Brigg's sugar degree (hereinafter abbreviated as "Bx") of 5) is used.

It is possible to provide a previously concentrated vegetable juice, and to carry out extraction of the juice and treatment of the juice with resin at different times. This ensures a decrease in the cost of storing the vegetable juice and minimizing the capacities of tanks and auxiliary facilities.

In this instance, the vegetable juice obtained in the previous step is frozen for storage. The frozen juice is thawed before treatment with the resin. Although this procedure may increase the concentration of the vegetable juice to be processed, the amount of resin can be appropriately determined according to the Bx of the vegetable juice, because the Bx of vegetable juice should be proportionate to the amount of resin used. For example, if the Bx of a cabbage juice is 10, the amount of resin should be twice the amount mentioned above; if the Bx is 15, the amount of resin should be three times.

Taking into account the effect of viscosity, the efficiency of associated equipment such as tanks, and the recovery ratio, and the like, ideal conditions to ensure easy processing in the concentration of the above-mentioned vegetable juice is about 15 Bx (about 60 parts of resin for 100 parts of vegetable juice). Because an organic acid is added to the vegetable juice before processing, the pH is desirably in the range of 3.5–4.0 without regard to the concentration.

In the treatment of the vegetable juice or its concentrate with the organic acid-absorbing resin, the feed rate of the vegetable juice to the organic acid-absorbing resin column, in terms of space velocity (SV), is about SV=2–20 BV/h, which means that vegetable juice of a volume equivalent to the resin is fed to the column in 3 to 30 minutes, and preferably about SV=8–10 BV/h.

When feeding of the vegetable juice is started, the eluate from the column initially contains water. Water comes in even at the completion of the extraction process. The timing of recovery should therefore be decided taking the economy in terms of yield and the concentration of the finished product into consideration.

The total amount of vegetable juice processed by a unit volume of resin is selected taking into account characteristics expected of the target vegetable juice such as resistance to high temperature storage.

It should be noted that the above-described amount of vegetable juice to be processed by a unit volume of resin and the volume of resin to the amount of vegetable juice are given as a standard indication. With regard to a cabbage juice with the Bx of about 15, when the treated amount of vegetable juice exceeds three parts by volume for one part by volume of resin, a vegetable odor begins to remain in the resulting vegetable juice and it becomes difficult to produce a vegetable juice with excellent storage stability at high temperatures.

However, there is no resin odor at all, even if the above-described vegetable juice with a Bx of about 15 is processed up to an amount of 10 times the volume of the resin. In addition, because a vegetable juice with a pH of about 4.0 before treatment is recovered as a juice with a pH of about 4.1 to 4.5, these conditions are very advantageous for combating microorganisms during treatment. Although it is possible to obtain the juice as a product or a raw material for a product as is, the juice is preferably filtered to remove resin chips and the like which may be present. As required, the juice may be further concentrated.

In addition, to prevent deterioration during storage β-cyclodextrin may be dissolved in an amount of 0.1 to 0.5% straight concentration vegetable juice (Bx 5).

Moreover, it is also effective for preventing deterioration to dissolve sodium chloride in an amount of 0.08 to 0.3% in a straight concentration vegetable juice (Bx 5).

The vegetable juice of the present invention thus obtained contains almost all effective components, such as ascorbic acid and amine-type nitrogen components, which are contained in the vegetable juice before processing by low temperature extraction and the resin treatment.

It is desirable to obtain the vegetable juice of the present invention as a transparent juice. To obtain the transparent vegetable juice, at least one treatment to make the juice transparent must be carried out in either step of the process, particularly preferably prior to the resin treatment step. This treatment for preparing transparent juice comprises, for example, adding an organic acid to the vegetable juice produced by crushing and extraction to accelerate precipitation of suspensions, and treating the juice with an enzyme such as pectinase. Treatment with an UF membrane is another example of a method for preparing a transparent vegetable juice.

In the above method for preparing a transparent vegetable juice, a conventional filtration method is suitably employed as a post-treatment after treatment with an enzyme such as pectinase. The enzyme used can be deactivated by heat treatment at 85° C. or higher. Enzyme treatment of a vegetable juice with a low pH produced by the addition of an organic acid, followed by heat treatment to deactivate the enzyme is particularly effective to promote secondary precipitation of proteins. The protein precipitates thus produced can be removed by centrifugation, filtration using kieselguhr, or the like.

The weakly basic anion exchange resin used for treating the vegetable juice can be regenerated for repeated use.

The regeneration can preferably be carried out in the order of alkali washing, acid washing, and alkali washing. Completion of regeneration can be confirmed by the absence of odor, the pH of the effluent water, and the absence of phenolphthalein color in the effluent water.

The vegetable juice of the present invention can be served as a drink as is, or optionally after the addition of various additives to adjust taste or flavor, such as salt (sodium chloride), a sweetener such as sugar, a sour tasting additive, a perfume, and a preservative. A step for the addition of these additives may be provided in the process of the present invention. Moreover, it is also possible to prepare a mixed juice by blending the vegetable juice with a transparent or opaque fruit juice.

Beside drinks, the vegetable juice of the present invention can be used for preparing vegetable jelly, vegetable-containing yoghurt, vegetable pudding, jam, and the like by blending with a thickner or a gelation polysaccharide, such as pectin, agar, or carrageen, fermented milk, egg yolk, and the like. It is also possible to use the vegetable juice in foods such as gum drop, chocolate, bread, candy, and the like.

Although the mechanism whereby vegetable juice with excellent storage stability and minimum change in the flavor can be obtained by the process of the present invention is not known, it is understood that the process for causing the weakly basic anion exchange resin to adsorb an organic acid, followed by sufficiently washing with water, completely removes amines imperfectly combined with the resin, which are considered to be the cause of the resin odor. As a result, the vegetable juice is not contaminated with such imperfectly combined amines even if the juice is treated with the resin after the addition of an organic acid. This is thought to be the reason that the vegetable juice of the present invention is free from a resin odor.

In addition, the organic acid adsorbed by the weakly basic anion exchange resin and the organic acid added to the vegetable juice may produce a new cross-linked material on the surface of the resin. This cross-linked material is believed to adsorb odorous substances or their precursors which may cause the unpleasant odor, thereby producing vegetable juice storable at room temperature.

Heretofore, a sourness reducing treatment for summer tangerines or grape fruit has been known as an application of a weakly basic anion exchange resin to juice. This resin is used in this method to reduce the acidity of fruit juice. There have been no suggestions relating to removal of unpleasant odorous components.

A process for decreasing the content of nitric acid ion in vegetable juice after treatment with a weakly basic anion exchange resin is also known ("Process for manufacturing carrot juice", Japanese Patent Application Laid-open No. 31678/1984). The inventor of this patent describes that a "treatment to remove about 60–70% of nitric acid ion is desirable for preventing a decrease in the flavor of the carrot juice", implying that the treatment with the weakly basic anion exchange resin to reduce nitric acid ion may have something to do with a decrease in flavor. The inventor further states in the examples that "there is no difference in flavor between the method of the invention and the conventional method". The object of this patent is thus the removal of nitric acid ion components and it is clear that the patent does not suggest anything about removal of unpleasant odors.

An example of the method for treating juice with the other ion exchange resin relates to a process for removing s-methyl methionine sulfonium which is a precursor of an odorous substance produced when juice from Wenzhou tangerine is heated. According to this process the s-methyl methionine sulfonium is removed by an acidic cation-exchange resin (Osashima Yutaka et al., "Removal of s-methyl methionine sulfonium in Wenzhou tangerine juice", Journal of Agricultural Chemistry Association, Vol. 59, No.5 (1985)). Another example relates to a method for manufacturing high-quality vegetable juice by treating a vegetable juice with a cation exchange resin (Method For Manufacturing Vegetable Juice, Japanese Patent Application Laid-open No. 56711/1993). The both methods employ an acidic cation-exchange resin and neither suggests the use of a weakly basic anion exchange resin, particularly the use of the weakly basic anion exchange resin treated with an organic acid of the present invention.

A method for causing a basic resin to adsorb a complex salt and then causing the resin to adsorb an ion as a complex salt is known in the art. A typical example is a method comprising causing a basic resin to adsorb citric acid, then causing the resin to adsorb a polyvalent ion such as Fe, Al, or V as a complex salt to separate these polyvalent ions from alkali metals (for example, Mitsubishi Kasei Technical Service Series, Diaion Ion Exchange Resin-Synthetic Adsorbent, Manual [II], p 35~). This method is industrially applied to the removal of metal ions in the purification of hydrochloric acid.

The relationship between removal of the components producing unpleasant odor according to the present invention and the removal of metals according to this prior art technology is quite unknown. There has been no example showing application of this method to the food industry. Clearly, no suggestions were given as far as a relationship with the present invention is concerned.

Accordingly, it is clear that the storable vegetable juice of the present invention is not based on any conventionally known actions of ion exchange resins. The present invention is thus believed to be based on a new mechanism which is quite different from any known actions of ion exchange resins.

Other features of the invention will become apparent in the course of the following description of the exemplary embodiments which are given for illustration of the invention and are not intended to be limiting thereof.

EXAMPLES

Example 1

(1) The cores of a cabbage was removed and the cabbage was cut with a cutter crosswise into four equal fractions. The leaves of the cabbage were separated and washed with a detergent suitable for use with foods. After rinsing to remove the detergent the leaves were immersed in a 0.3% ascorbic acid solution for 3 minutes.

The leaves were then crushed while pouring a 1.5% ascorbic acid solution in the amount of one part to 9 parts of the cabbage using a micro-grader. Juice was extracted from the crushed cabbage using a Vetter-type screw press. The collected juice was heated for 10 seconds at 110° C., thus obtaining a crude cabbage juice with a pH of 5.7 containing ascorbic acid at a concentration of 105 mg %.

(2) A 0.25% citric acid solution was added to the crude cabbage juice thus obtained to confirm the pH was about 4.0. After the addition of Pectinase SS™ (manufactured by Yakult Pharmaceutical Industry Co., Ltd.) to make a concentration of 0.05%, an enzymatic reaction was carried out at 45° C. for one hour. After the enzymatic reaction, the resultant mixture was heated at 95° C. for 10 seconds, quenched, and subjected to a DeLaval centrifuge separator to remove suspensions. The mother liquor was filtered through #200 kieselguhr and concentrated under vacuum to 30 Bx.

(3) A weakly basic anion exchange resin, IRA-94S™ was filled into a column (the resin volume: 1000 l). An organic acid (citric acid) was adsorbed on the resin by causing 1N citric acid in the amount of 3 BV to pass through the column. The resin was then washed with 18 BV of ion exchanged water. The organic acid treated resin in this column had a pH of 2.82 and contained citric acid at a concentration of acid degree of 0.08%.

(4) The vegetable juice obtained in (2) above was diluted to 15° Bx to obtain a vegetable juice for treatment (ascorbic acid content: 310 mg %, 3.99 pH, acid degree of citric acid: 1.3%). 2000 l of this vegetable juice was passed downward through the organic acid-treated column prepared in (3) above at a space velocity of SV=10 and a flow rate of 1000 l/6 minutes.

(5) To avoid dilution of the vegetable juice when switching to water, vegetable juice collected during 5 minutes from the start of elution and 5 minutes from the start of water feeding after the treatment was rejected.

1930 l of vegetable juice (recovered juice) at 14.4 Bx and 4.3 pH was thus obtained.

(6) Regeneration and washing of the organic acid-treated resin IRA-94S™ in the column used in (4) above were carried out as follows.

Specifically, particularly to wash out coloring matters first of all, normal water in the amount of 2 BV or more, followed by 1N solution of NaOH in an amount of 2.5 BV at a space velocity of about SV=10, were passed through the column after the treatment in (5) above. Then, after washing with ion exchange water in the amount of 5 BV or more, a 1N solution of hydrochloric acid in the amount of 2.5 BV was fed to the column at a space velocity of about SV=10. The column was again washed with ion exchange water in the amount of 5 BV or more, treated with a 1 N solution of NaOH in the amount of 2.5 BV at about SV=10, then finally washed with ion exchange water in the amount of 5 BV or more.

This second alkali washing was carried out to return the resin to its basic (alkaline) state and to cause the coloring matter which was not removed in the first alkali washing to come into contact with the alkali solution due to swelling of the resin by the acid treatment, thereby ensuring more effective washing (the resin may shrink under alkaline conditions, so that one alkali washing may not completely remove coloring matter)

Example 2

0.5 part of β-cyclodextrin was added to 100 parts of the vegetable juice (14.3 Bx) obtained in Example 1 and the mixture was stirred for 20 minutes to dissolve the β-cyclodextrin in the vegetable juice.

Example 3

(1) The core of a cabbage was removed and the cabbage was cut with a cutter crosswise into four equal fractions. The leaves of the cabbage were separated and washed with a detergent suitable for food use. After rinsing with water, the leaves were treated with hot water to heat the center of thickest ribs to 85° C.

The leaves were then crushed using a micro-grader and the juice was extracted using a screw press. The collected juice was heated for 10 seconds at 110° C., and ascorbic acid was added to a concentration of about 100 mg %, thus obtaining a crude cabbage juice with a pH of 6.0.

(2) A citric acid solution was added to the crude cabbage juice thus obtained to adjust the pH to 4.0. In this instance, the amount of citric acid solution used was 1000 l for 2.6 kg of the juice. After the addition of Pectinase SS™ (manufactured by Yakult Pharmaceutical Industry Co., Ltd.) to make a concentration of 0.05%, an enzymatic reaction was carried out at 45° C. for one hour. After the enzymatic reaction, the resultant mixture was heated at 95° C. for 10 seconds, quenched, and centrifuged in a DeLaval centrifugal separator to remove suspensions. Because the resulting liquor was slightly opaque, the liquor was filtered through #500 kieselguhr, then #200 kieselguhr, and concentrated under vacuum to 30° Bx.

(3) The concentrated vegetable juice was diluted to 15 Bx to obtain a vegetable juice for treatment (ascorbic acid concentration: 295 mg %, pH 3.95).

2000 l of this juice was run through the IRA-94S™ column, which was previously treated with an organic acid and washed with water (resin volume: 1000 l, resin pH 2.83, acid degree of citric acid: 0.07%) in the same manner as in Example 1 (3), by a downward countercurrent flow, at a space velocity of SV=10 and a flow rate of 1000 l/6 minutes. To avoid dilution of the vegetable juice when switching to water, vegetable juice collected during 5 minutes from the start of elution and 5 minutes from the start of water feeding after the treatment was discharged.

1940 l of vegetable juice at 14.2° Bx and 4.3 pH was thus obtained.

The IRA-94S™ column was regenerated and washed in the same manner as in Example 1 (6).

Comparative Example 1

(1) The core of a cabbage was removed and the cabbage was cut with a cutter crosswise into four equal fractions. The leaves of the cabbage were separated and washed with a detergent suitable for food use. After rinsing with water, the leaves were treated with hot water to heat the center of thickest ribs to 85° C.

The leaves were then crushed using a micro-grader and juice was extracted using a screw press. The collected juice was heated for 10 seconds at 110° C., and ascorbic acid was added to a concentration of about 100 mg %, thus obtaining a crude cabbage juice with a pH of 5.9.

(2) After the addition of Pectinase SS™ (manufactured by Yakult Pharmaceutical Industry Co., Ltd.) to make a concentration of 0.05%, an enzymatic reaction was carried out at 45° C. for one hour. After the enzymatic reaction, the resultant mixture was heated at 95° C. for 10 seconds, cooled, and centrifuged in a DeLaval centrifugal separator to remove suspensions.

The resulting liquor was filtered through #500 kieselguhr, then #200 kieselguhr, and concentrated to 30 Bx. The properties of the concentrated vegetable juice were 30.2 Bx, the acid degree of citric acid: 0.32%, and 5.1 pH.

Comparative Example 2

(1) The vegetable juice obtained in the Comparative Example 1 was diluted to 15 Bx to obtain a vegetable juice for treatment (ascorbic acid content: 293 mg %, pH 5.2).

(2) To 1000 ml of this vegetable juice was added 600 ml of the resin IRA-94S™ regenerated and washed in same manner as in Example 1(6). The mixture was gently stirred for 10 minutes and the resin was separated using an 80 mesh filter. The juice obtained had a pH of 9.8 and the odor of ammonia, and was unacceptable as a drink.

Comparative Example 3

(1) The concentrated vegetable juice obtained in the Comparative Example 1 was diluted to 15° Bx and 20% citric acid solution was added to adjust the pH to 4.0.

(2) To 1000 ml of this vegetable juice was added 600 ml of the resin IRA-94S™ regenerated and washed in same manner as in Example 1 (6). The mixture was gently stirred for 10 minutes and the resin was separated using an 80 mesh filter. The cabbage juice obtained had the properties of 11.8 Bx and 7.2 pH.

Comparative Example 4

(1) The concentrated vegetable juice obtained in the Comparative Example 1 was diluted to 15 Bx and 20% citric acid solution was added to adjust the pH to 4.0.

(2) 1000 ml of this juice was treated with the regenerated IRA-94S™ column (resin volume 500 ml) by downward countercurrent flow. The initial fraction of the juice had a strong odor of ammonia and was thus discarded. However, the following fractions continued to have an ammonium odor and could not be used as a drink.

Evaluation Example 1

(1) The undiluted vegetable juices (original) prepared in Example 1–3, Comparative Example 1, and Comparative Example 3 were adjusted to a concentration of 30% (converted to 1.5 Bx) and citric acid was added to make 4.0 pH. 100 ml of each juice was hot packed into a bottle and subjected to composition analysis. The results are shown in Table 1.

TABLE 1

|  | Example | | | Comparative Example | |
| --- | --- | --- | --- | --- | --- |
|  | 1 | 2 | 3 | 1 | 3 |
| Bx | 1.5 | 1.5 | 1.6 | 1.6 | 1.5 |
| pH | 3.98 | 3.99 | 3.98 | 3.99 | 4.00 |
| Ascorbic acid (mg %) | 16.3 | 16.2 | 15.8 | 16.4 | 14.5 |
| Amine-type nitrogen (mg %) | 24.4 | 24.2 | 22.1 | 24.7 | 20.2 |

Evaluation Example 2

The ascorbic acid concentration of each vegetable juice used in the Evaluation Example 1 was adjusted to 20 mg %. The juice was then hot packed.

The juices produced on the same day and stored for a prescribed number of days at 37° C. after production were cooled and subjected to.an organoleptic test.

The organoleptic test was carried out by nine panelists, all being researchers working in the development of fruit juices, to evaluated the presence or absence of ① cabbage odor, ② unordinary stench (stench of pickles or rotten pickles; the panelists smelled a similar odor beforehand for training), and ③ resin odor (stench of amine; the panelists smelled an odor of fresh IRA-94S beforehand for training). The results of the organoleptic test were rated according to the following standard.

The odor of cabbage, unordinary stench, and resin odor on the same day on which the vegetable juice was prepared are shown in Table 2, and the odor of cabbage and the unordinary stench of the juice stored at 37° C. for four weeks and eight weeks are shown in Table 3.

Evaluation standard

Score:

0: There was no odor at all.

1: An odor was identified only with difficulty.

2: A very slight odor was sensed.

3: A slight odor was sensed.

4: The odor is significant.

5: The odor was strong.

TABLE 2

| | The same day on which juice was prepared. | | |
|---|---|---|---|
| | Cabbage odor | Unordinary stench | Resin odor |
| Example 1 | 3.0 | 0.7 | 0.5 |
| Example 2 | 2.6 | 0.6 | 0.5 |
| Example 3 | 3.2 | 0.8 | 0.8 |
| Comparative Ex. 1 | 3.8 | 1.5 | 0.5 |
| Comparative Ex. 3 | 3.2 | 1.1 | 3.0 |

TABLE 3

| | After 4 weeks at 37° C. | | After 8 weeks at 37° C. | |
|---|---|---|---|---|
| | Cabbage odor | Unordinary stench | Cabbage odor | Unordinary stench |
| Example 1 | 3.1 | 1.0 | 3.2 | 1.7 |
| Example 2 | 2.3 | 0.8 | 2.7 | 1.5 |
| Example 3 | 3.5 | 1.2 | 3.5 | 2.0 |
| Comparative Ex. 1 | 4.0 | 3.6 | 4.1 | 4.3 |
| Comparative Ex. 3 | 3.6 | 1.3 | 3.6 | 2.0 |

As clear from the Evaluation Examples 1 and 2, the vegetable juice of the present invention produced almost no unordinary bad odor after storage at 37° C. in spite of the fact that there was almost no difference in the composition of the juice of the present invention and that prepared by a conventional process. In addition, the vegetable juices of the Examples 1–3 were completely free from a resin odor which was possessed by the juice prepared in the Comparative Example 3.

Industrial Applicability

The process of the present invention prevents production of an unordinary bad odor like a pickle stench in vegetable juice when the juice is stored at ordinary temperatures. The process thus has made it possible for a variety of vegetable juices such as cabbage juice and broccoli juice, which have not been provided as commercial products heretofore, to be served as drinks which can be stored at ordinary temperatures. This has been achieved by preventing the vegetable juice from being contaminated by a resin odor, incorporation of which has been unavoidable in the conventional process for manufacturing vegetable juice, by means of a special method comprising contacting a weakly basic anion exchange resin with an organic acid.

The process of the present invention thus provides a convenient new type of vegetable drink with a natural flavor and desirable form from the aspect of food hygiene. These effects are significant in the food industry.

We claim:

1. A process for preparing storable vegetable juice comprising crushing vegetables selected from the group consisting of cabbage, broccoli, brussels sprouts, cauliflower, kohlrabi, radish, onion and eggplant to extract juice, adding an organic acid to the vegetable juice, separately absorbing an organic acid onto a weakly basic anion exchange resin, then washing the resin with water until the pH of washing effluent is 2.6 or more, thereby removing amine compounds from the resin and treating said acidified juice with the washed resin.

2. The process for preparing storable vegetable juice according to claim 1, wherein the weakly basic anion exchange resin on which an organic acid has been adsorbed is prepared by causing a weakly basic anion exchange resin to adsorb an organic acid and washing the resulting resin with water until the acidity of the effluent water is reduced to 0.2% or below.

3. The process for preparing storable vegetable juice according to claim 1, wherein the weakly basic anion exchange resin on which an organic acid has been adsorbed is used in an amount of 10 to 100 parts for 100 parts of the extracted vegetable juice.

4. The process for preparing storable vegetable juice according to claim 1, wherein the pH of the vegetable juice after the addition of an organic acid is higher than the pH of the resin.

5. The process for preparing storable vegetable juice according to claim 1, further comprising at least one treatment to make the juice more transparent.

6. The process for preparing storable vegetable juice according to claim 1, further comprising a step of adding cyclodextrin.

7. A food containing a vegetable juice prepared by the process defined in claim 1.

* * * * *